US012670363B2

(12) United States Patent
Shen et al.

(10) Patent No.: US 12,670,363 B2
(45) Date of Patent: Jun. 30, 2026

(54) MIXTURE-OF-EXPERTS MODEL IMPLEMENTATION METHOD AND SYSTEM, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Liang Shen, Beijing (CN); Haifeng Wang, Beijing (CN); Huachao Wu, Beijing (CN); Weibao Gong, Beijing (CN); Zhihua Wu, Beijing (CN); Dianhai Yu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/026,140

(22) PCT Filed: Sep. 20, 2022

(86) PCT No.: PCT/CN2022/119752
§ 371 (c)(1),
(2) Date: Mar. 14, 2023

(87) PCT Pub. No.: WO2023/201981
PCT Pub. Date: Oct. 26, 2023

(65) Prior Publication Data
US 2025/0036920 A1     Jan. 30, 2025

(30) Foreign Application Priority Data
Apr. 22, 2022    (CN) .......................... 202210430519.8

(51) Int. Cl.
G06N 3/045      (2023.01)
G06N 3/0495     (2023.01)

(52) U.S. Cl.
CPC ........... G06N 3/045 (2023.01); G06N 3/0495 (2023.01)

(58) Field of Classification Search
CPC ........... G06N 3/02; G06N 3/04; G06N 3/042; G06N 3/045; G06N 3/0495; G06N 3/098
(Continued)

(56) References Cited

U.S. PATENT DOCUMENTS

2019/0188577 A1*   6/2019   Malaya .................... G06N 3/08
2019/0251423 A1*   8/2019   Shazeer ................ G06N 3/045
(Continued)

FOREIGN PATENT DOCUMENTS

CN          114169427 A       3/2022
CN          114186633 A       3/2022
(Continued)

OTHER PUBLICATIONS

Shazeer et al., "Outrageously Large Neural Networks: The Sparsely-Gated Mixture-of-Experts Layer", ARXID ID: 1701.06538v1, Jan. 23, 2017, pp. 1-19. (Year: 2017).*
(Continued)

*Primary Examiner* — Hwei-Min Lu
(74) *Attorney, Agent, or Firm* — Brooks Kushman P.C.

(57) ABSTRACT

The present disclosure provides a mixture-of-experts (MoE) model implementation method and system, an electronic device, and a storage medium, and relates to the field of artificial intelligence (AI) such as deep learning and distributed storage. The method includes: constructing a communication group, the communication group including a tensor-parallelism communication group, the tensor-parallelism communication group including at least two computing devices, tensor-parallelism segmentation being adopted for sparse parameters of each of the computing devices in a same tensor-parallelism communication group; and training
(Continued)

an MoE model based on the communication group. By use of the solutions of the present disclosure, normal operation of model training can be guaranteed.

3 Claims, 5 Drawing Sheets

(58) Field of Classification Search
USPC ........................................ 706/15, 25, 27, 34
See application file for complete search history.

(56) References Cited

U.S. PATENT DOCUMENTS

| | | | |
|---|---|---|---|
| 2020/0151580 A1 | 5/2020 | Horesh et al. | |
| 2020/0279150 A1 | 9/2020 | Shazeer et al. | |
| 2022/0253680 A1* | 8/2022 | Zhao ...................... | G06N 3/045 |
| 2023/0107409 A1* | 4/2023 | Jenatton ............... | G06N 3/0895 |
| | | | 706/15 |
| 2023/0196211 A1* | 6/2023 | Ruiz .................... | G06N 3/0495 |
| | | | 706/12 |
| 2023/0316042 A1* | 10/2023 | Darvish Rouhani ........................ | |
| | | | G06N 3/0495 |
| | | | 706/16 |
| 2023/0325716 A1* | 10/2023 | Men ........................ | G06F 21/14 |
| | | | 706/12 |

FOREIGN PATENT DOCUMENTS

| | | |
|---|---|---|
| CN | 114202027 A | 3/2022 |
| CN | 114282681 A | 4/2022 |
| CN | 114841315 A | 8/2022 |

OTHER PUBLICATIONS

Shazeer et al., "Outrageously Large Neural Networks: The Sparsely-Gated Mixture-of-Experts Layer", ARXIV ID: 1701.06538v1, Jan. 23, 2017, pp. 1-19. (Year: 2017).*
Lepikhin et al., "GShard: Scaling Giant Models with Conditional Computation and Automatic Sharding", ARXIV ID: 2006.16668v1, Jun. 30, 2020, pp. 1-35. (Year: 2020).*
Fedus et al., "Switch Transformers: Scaling to Trillion Parameter Models with Simple and Efficient Sparsity", ARXIV ID: 2101.03961v1, Jan. 11, 2021, pp. 1-31. (Year: 2021).*
Zoph et al., "Designing Effective Sparse Expert Models", ARXIV ID: 2202.08906, Feb. 17, 2022, pp. 1-38. (Year: 2021).*
He et al., "FastMoE: A Fast Mixture-of-Expert Training System", ARXIV ID: 2103.13262v1, Mar. 24, 2021, pp. 1-11. (Year: 2021).*
You et al., "SpeechMoE: Scaling to Large Acoustic Models with Dynamic Routing Mixture of Experts", ARXIV ID: 2105.03036, May 7, 2021, pp. 1-6. (Year: 2021).*
Yang et al., "M6-T: Exploring Sparse Expert Models and Beyond", ARXIV ID: 2105.15082v5, Aug. 9, 2021, pp. 1-16. (Year: 2021).*
Nie et al., "EvoMoE: An Evolutional Mixture-of-Experts Training Framework via Dense-To-Sparse Gate", ARXIV ID: 2112.14397v1, Dec. 29, 2021, pp. 1-13. (Year: 2021).*
Rajbhandari et al., "DeepSpeed-MoE: Advancing Mixture-of-Experts Inference and Training to Power Next-Generation AI Scale", ARXIV ID: 2201.05596v1, Jan. 14, 2022, pp. 1-31. (Year: 2022).*
He et al., "FasterMoE: Modeling and Optimizing Training of Large-Scale Dynamic Pre-Trained Models", PPOPP '22: Proceedings of the 27th ACM SIGPLAN Symposium on Principles and Practice of Parallel Programming, Apr. 2-6, 2022, pp. 120-134. (Year: 2022).*
Communication pursuant to Rules 70(2) and 70a(2) EPC dated Jun. 11, 2024 of European patent application No. 22865889.4, 11 pages.
He et al., "FasterMoE: modeling and optimizing training of large-scale dynamic pre-trained models", Proceedings of the 27th ACM SIGPLAN Symposium on Principles and Practice of Parallel Programming, [Online] Apr. 2, 2022 (Apr. 2, 2022), pp. 120-134, XP093153723, New York, NY, USA ISBN: 978-1-4503-9204-4, Retrieved from the Internet:URL:https://web.archive.org/web/202206181716id_/https://dl.acm.org/doi/pdf/10.1145/3503221.3508418> [retrieved on Apr. 19, 2024], abstract, pp. 120-p. 131.
Nie et al., "HetuMoE: An Efficient Trillion-scale Mixture-of-Expert Distributed Training System", arXiv (Cornell University), Apr. 1, 2022 (Apr. 1, 2022), XP093153368, Ithaca DOI: 10.48550/arxiv.2203.14685, Retrieved from the Internet: URL:https://arxiv.org/pdf/2203.14685v2.pdf [retrieved on Apr. 19, 2024], the whole document, 8 pages.
Rajbhandari et al., "DeepSpeed-MoE: Advancing Mixture-of-Experts Inference and Training to Power Next-Generation AI Scale", arXiv (Cornell University), Jan. 14, 2022 (Jan. 14, 2022), XP093154001, Ithaca DOI: 10.48550/arxiv.2201.05596 Retrieved from the Internet: URL:https://arxiv.org/pdf/2201.05596v1.pdf [retrieved on Apr. 19, 2024], the whole document, 31 pages.

* cited by examiner

500

600

MIXTURE-OF-EXPERTS MODEL IMPLEMENTATION METHOD AND SYSTEM, ELECTRONIC DEVICE, AND STORAGE MEDIUM

CROSS-REFERENCE TO RELATED APPLICATIONS

This application is a U.S. national phase of International Application No. PCT/CN2022/119752, filed Sep. 20, 2022, which claims priority to Chinese Patent Application No. 202210430519.8, filed on Apr. 22, 2022, entitled "MIXTURE-OF-EXPERTS MODEL IMPLEMENTATION METHOD AND SYSTEM, ELECTRONIC DEVICE, AND STORAGE MEDIUME", which are hereby incorporated by reference herein in their entireties.

FIELD OF THE DISCLOSURE

The present disclosure relates to the field of artificial intelligence (AI) technologies, and in particular, to a mixture-of-experts (MoE) model implementation method and system, an electronic device, and a storage medium in fields such as deep learning and distributed storage.

BACKGROUND OF THE DISCLOSURE

An MoE model is a neural network. However, unlike a general neural network, the MoE model can separate and train a plurality of models according to data, and each model may be called an expert network. That is, an idea of the MoE model is to train a plurality of expert networks, and each expert network is applied to a different part of a dataset. As an emerging sparse-activation deep learning model architecture, the MoE model enables ultra-large-scale model training.

SUMMARY OF THE DISCLOSURE

The present disclosure provides an MoE model implementation method and system, an electronic device, and a storage medium.

A method of MoE model implementation, including:

constructing a communication group, the communication group including a tensor-parallelism communication group, the tensor-parallelism communication group including at least two computing devices, tensor-parallelism segmentation being adopted for sparse parameters of each of the computing devices in a same tensor-parallelism communication group; and training an MoE model based on the communication group.

A system of MoE model implementation, including a communication group and configured to train an MoE model based on the communication group; and the communication group including a tensor-parallelism communication group, the tensor-parallelism communication group including at least two computing devices, tensor-parallelism segmentation being adopted for sparse parameters of each of the computing devices in a same tensor-parallelism communication group.

An electronic device, including:

at least one processor; and a memory in communication connection with the at least one processor; wherein the memory stores instructions executable by the at least one processor, and the instructions are executed by the at least one processor to enable the at least one processor to perform the method as described above.

A non-transitory computer-readable storage medium storing computer instructions, wherein the computer instructions are configured to cause a computer to perform the method as described above.

A computer program product, including a computer program/instruction, wherein, when the computer program/instruction is executed by a processor, the method as described above is performed.

One of the above disclosed embodiments has the following advantages or beneficial effects. The tensor-parallelism segmentation is adopted for the sparse parameters, which can prevent extremely large sparse parameters (such as expert network parameters), thereby preventing problems such as memory overflow caused by impossible support by the computing devices and ensuring normal operation of model training.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

In addition, it should be understood that the term "and/or" herein is merely an association relationship describing associated objects, indicating that three relationships may exist. For example, A and/or B indicates that there are three cases of A alone, A and B together, and B alone. Besides, the character "/" herein generally means that associated objects before and after it are in an "or" relationship.

Figure 1:
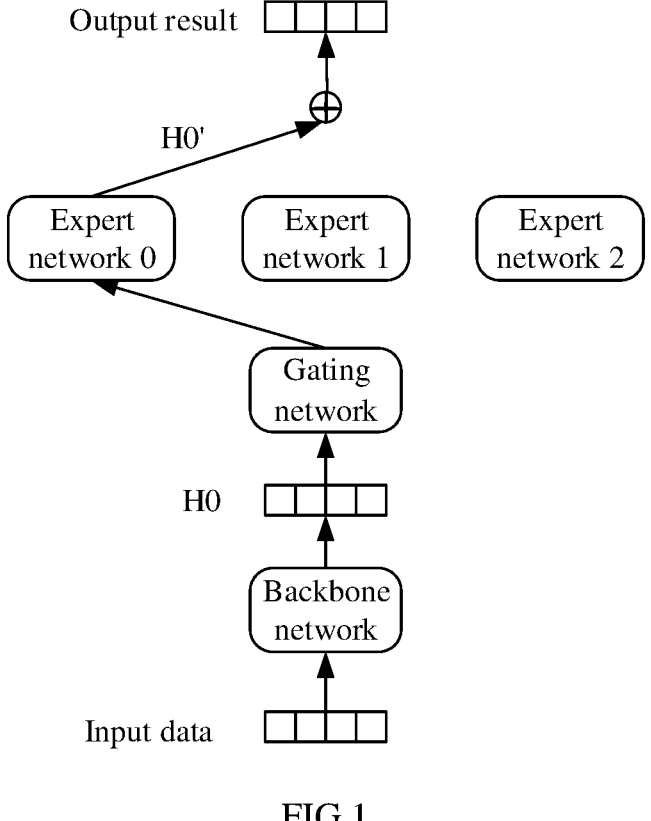
FIG. 1 is a schematic diagram of a data processing manner of an existing MoE model.

FIG. 1 is a schematic diagram of a data processing manner of an existing MoE model. As shown in FIG. 1, after input data is processed (i.e., calculated) by a backbone network, a processing result H0 is obtained. The backbone network is generally some fully connected layers. Then, a gating network may select an expert network as a routing network for the processing result H0, and k expert networks with the highest scores may generally be selected, where k is a positive integer. That is, a number of the selected expert network may be 1 or more. As illustrated, assuming that an expert network 0 is selected, further, the expert network 0 may process the processing result H0, so as to obtain a processing result H0' as a final output result.

For the MoE model shown in FIG. 1, in an actual application, the problem of extremely large expert network parameters possibly arises, resulting in impossible support by the computing device, such as memory overflow, thereby affecting normal model training.

Figure 2:
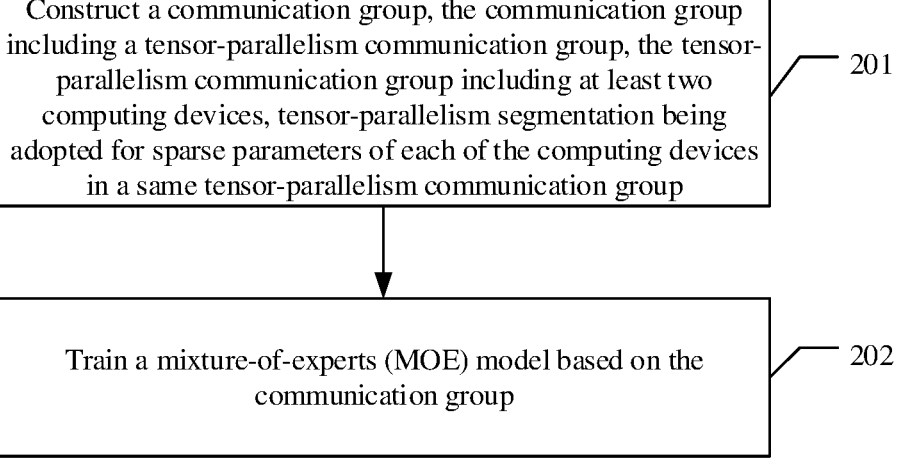
FIG. 2 is a flowchart of an embodiment of a method of MoE model implementation according to the present disclosure.

To this end, the present disclosure proposes a method of MoE model implementation. Correspondingly, FIG. 2 is a flowchart of an embodiment of a method of MoE model implementation according to the present disclosure. As shown in FIG. 2, the following specific implementation is included.

In step 201, a communication group is constructed, the communication group including a tensor-parallelism communication group, the tensor-parallelism communication group including at least two computing devices (workers), tensor-parallelism segmentation being adopted for sparse parameters of each of the computing devices in a same tensor-parallelism communication group.

In step 202, an MoE model is trained based on the communication group.

In the solution of the above method embodiment, the tensor-parallelism segmentation is adopted for the sparse parameters, which can prevent extremely large sparse parameters (such as expert network parameters), thereby preventing problems such as memory overflow caused by impossible support by the computing devices and ensuring normal operation of model training.

In an embodiment of the present disclosure, the constructed communication group may further include a data-parallelism communication group, the data-parallelism communication group includes at least two computing devices, and data parallelism is adopted for each of the computing devices in a same data-parallelism communication group. In addition, for any one of the tensor-parallelism communication groups, each of the computing devices is included in a data-parallelism communication group, and a first computing device set formed by the computing devices included in all the data-parallelism communication groups is equal to a second computing device set formed by the computing devices included in all the tensor-parallelism communication groups.

That is, a hybrid communication group including a tensor-parallelism communication group and a data-parallelism communication group may be constructed. Correspondingly, numbers of the tensor-parallelism communication group and the data-parallelism communication group may be both greater than or equal to 2.

Through the introduction of data parallelism into the MoE model, throughput of overall training can be improved.

Correspondingly, simultaneous introduction of data parallelism and tensor parallelism segmentation can take into account advantages of the two, thereby further improving a model training effect, etc.

Figure 3:
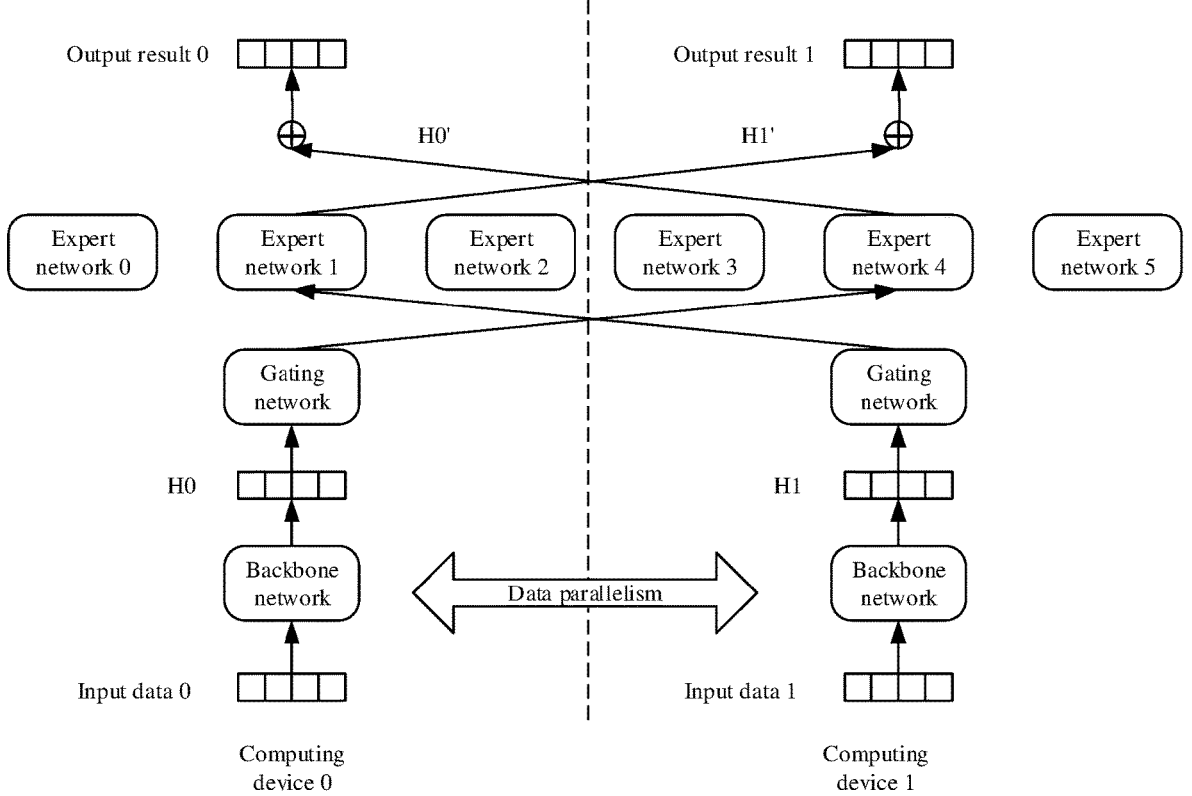
FIG. 3 is a schematic diagram of a data processing manner of an MoE model into which data parallelism is introduced.

The following is a description of specific implementation of data parallelism based on the MoE model shown in FIG. 1. FIG. 3 is a schematic diagram of a data processing manner of an MoE model into which data parallelism is introduced. As shown in FIG. 3, assuming that a computing device 0 and a computing device 1 correspond to 3 expert networks respectively, that is, a total number of the expert networks (total expert) is 6, and parameters of the expert networks are different from one another, the gating network may select an expert network as a routing network from the 6 expert networks, that is, cross-card communication (that is, communication across computing devices) may be performed. As illustrated, assuming that an expert network 4 and an expert network 1 are selected respectively, taking the computing device 0 as an example, the processing result H0 of the backbone network may be sent to the selected expert network 4, and after processing by the expert network 4, a processing result H0' is returned to the computing device 0, so as to obtain a final output result 0.

Figure 4:
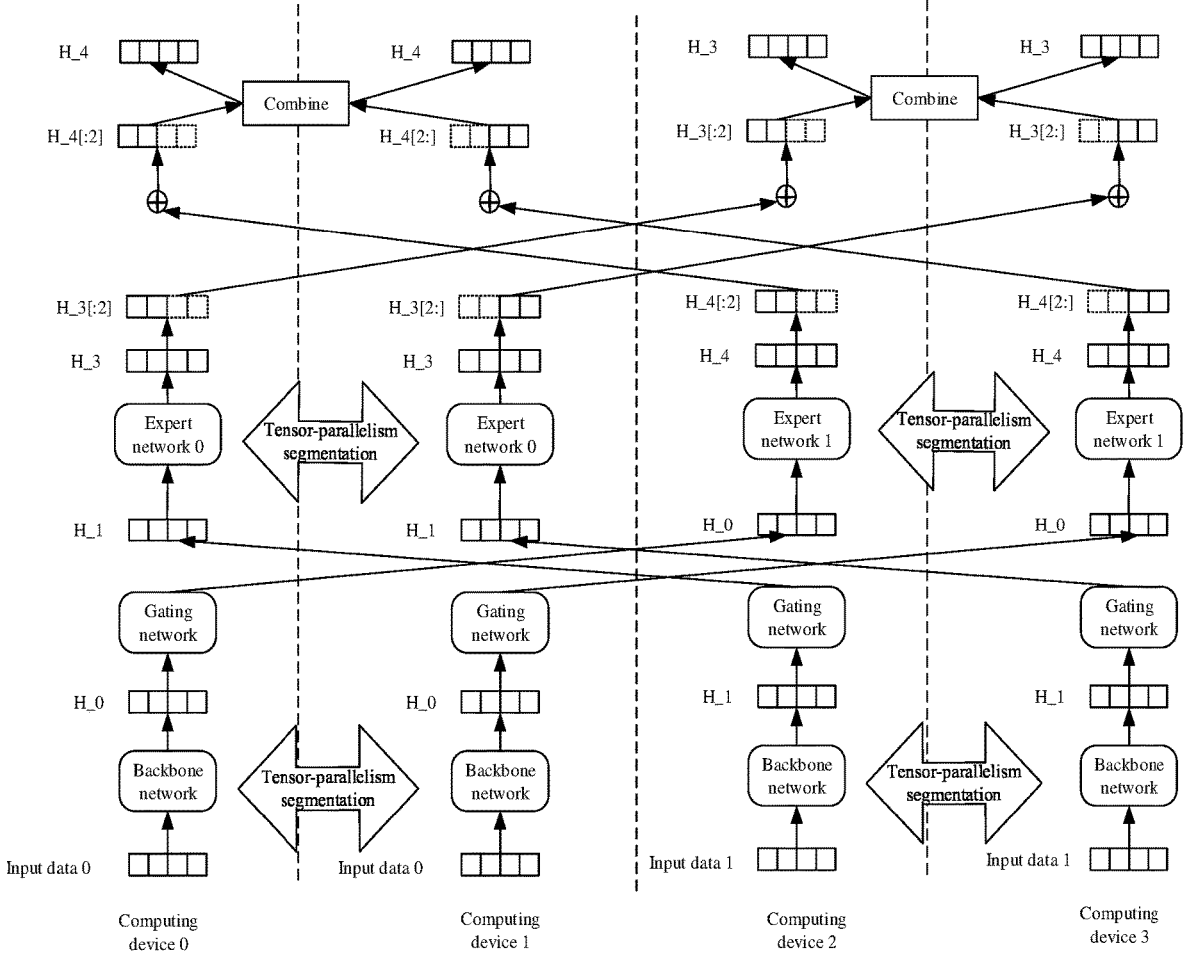
FIG. 4 is a schematic diagram of a data processing manner of an MoE model into which tensor tensor-parallelism segmentation and data parallelism are introduced according to the present disclosure.

Correspondingly, FIG. 4 is a schematic diagram of a data processing manner of an MoE model into which tensor-parallelism segmentation and data parallelism are introduced according to the present disclosure.

As shown in FIG. 4, in an embodiment of the present disclosure, any one of the computing devices may include: a backbone network configured to perform predetermined processing on input data to obtain a first processing result; a gating network configured to select an expert network as a routing network from expert networks of the computing devices in the data-parallelism communication group, and send the first processing result to the selected expert network; and the expert network configured to perform predetermined processing on the acquired first processing result to obtain a second processing result, and return a return result determined according to the second processing result to the computing device corresponding to the acquired first processing result. Different computing devices in a same tensor-parallelism communication group correspond to a same backbone network and a same expert network.

For ease of distinction, the processing result of the backbone network and the processing result of the expert network are called the first processing result and the second processing result respectively. In addition, a specific type of the predetermined processing is not limited, which may be determined according to an actual situation.

As shown in FIG. 4, in an embodiment of the present disclosure, the tensor-parallelism segmentation may also be adopted for dense parameters of each of the computing devices in the same tensor-parallelism communication group. The sparse parameters include: expert network parameters. The dense parameters include: backbone network parameters.

As shown in FIG. 4, it is assumed that there are a total of 4 computing devices, which are a computing device 0, a computing device 1, a computing device 2, and a computing device 3 respectively, and a parallel manner is 2-way data parallelism and 2-way tensor parallelism, and it is assumed that a total of two expert networks exist, which is an expert network 0 and an expert network 1 respectively. [Computing device 0, computing device 1] and [computing device 2, computing device 3] are 2 tensor-parallelism communication groups, [computing device 0, computing device 2] and [computing device 1, computing device 3] are 2 data-parallelism communication groups, and the 2 tensor-parallelism communication groups and the 2 data-parallelism communication groups jointly form the constructed hybrid communication group.

As shown in FIG. 4, tensor-parallelism segmentation is performed on the backbone network parameters in each tensor-parallelism communication group. The computing device 0 and the computing device 1 share a same backbone network, and the computing device 2 and the computing device 3 share a same backbone network. In addition, the computing device 0 and the computing device 1 read same input data 0, which is processed by the backbone network to obtain a same processing result H_0. Similarly, the computing device 2 and the computing device 3 read same input data 1, which is processed by the backbone network to obtain a same processing result H_1.

As shown in FIG. 4, the computing device 0 and the computing device 1 share a same expert network 0, and the computing device 2 and the computing device 3 share a same expert network 1. In each data-parallelism communication group, the gating network may select an expert network as a routing network for the corresponding first processing result. Assuming that a number of the selected expert network is 1, in the data-parallelism communication group [computing device 0, computing device 2], there are a total of 2 expert networks for selection. The gating network in the computing device 0 selects the expert network 1 in the computing device 2, and the gating network in the computing device 2 selects the expert network 0 in the computing device 0. Further, the gating networks in the computing device 0 and the computing device 2 may respectively send the corresponding first processing results to the selected expert networks for processing. Similarly, in the data-parallelism communication group [computing device 1, computing device 3], there are a total of 2 expert networks for selection. The gating network in the computing device 1 selects the expert network 1 in the computing device 3, and the gating network in the computing device 3 selects the expert network 0 in the computing device 1. Further, the gating networks in the computing device 1 and the computing device 3 may respectively send the corresponding first processing results to the selected expert networks for processing. Since the tensor-parallelism segmentation is adopted for the backbone network parameters, routing results of the computing device 1 and the computing device 0 are identical, and routing results of the computing device 3 and the computing device 2 are identical.

As shown in FIG. 4, since the tensor-parallelism segmentation is adopted for the expert network parameters, after the processing by the expert network, the expert networks in a same tensor-parallelism communication group may obtain a same second processing result. That is, the expert networks 0 in the computing device 0 and the computing device 1 may obtain a same second processing result H_3, and the expert networks 1 in the computing device 2 and the computing device 3 may obtain a same second processing result H_4.

The obtained second processing result is further required to be returned to the corresponding computing device. Specifically, the expert network may return a return result determined according to the second processing result to the computing device corresponding to the acquired first processing result.

The return result may refer to the second processing result. That is, the second processing result may be directly returned as the return result. Alternatively, in an embodiment of the present disclosure, the return result may include: part of content in the second processing result. Correspondingly, for any one of the tensor-parallelism communication groups, acquired parts of content belonging to a same second processing result may be combined to obtain a complete second processing result. The parts of the content are respectively returned by a same expert network corresponding to the computing devices in a same tensor-parallelism communication group.

The specific manner may be determined according to an actual requirement, which is very flexible and convenient. Preferably, the latter manner may be adopted.

In the latter manner, as shown in FIG. 4, since the second processing results obtained by the expert networks in a same tensor-parallelism communication group are the same, only part of content therein may be returned when the second processing results are returned. For example, the computing device 0 may return only first half content H_3[:2] of the second processing result H_3 to the computing device 2, and the computing device 1 may only return second half content H_3[2:] of the second processing result H_3 to the computing device 3. Similarly, the computing device 2 may only return first half content H_4[:2] of the second processing result H_4 to the computing device 0, and the computing device 3 may only return second half content H_4[:2] of the second processing result H_4 to the computing device 1, so as to reduce an amount of data to be transmitted, thereby reducing resource consumption, etc.

The above is based on an example in which a same tensor-parallelism communication group includes 2 computing devices. Assuming that 3 computing devices are included, ⅓ of the content of the same second processing result may be returned respectively, that is, front, middle, and last parts of the content are returned respectively. Generally, the returned parts of the content do not overlap with one another, so as to further reduce the resource consumption.

Since part of the content is returned, for any one of the tensor-parallelism communication groups, acquired parts of content belonging to a same second processing result are further required to be combined, so as to obtain a complete second processing result. That is, one all_gather communication is further required in the tensor-parallelism communication group to recover an original second processing result. As shown in FIG. 4, the computing device 0 and the computing device 1 acquire H_4[:2] and H_4[2:] respectively, and then H_4[:2] and H_4[2:] may be combined to obtain a complete second processing result H_4. Similarly, the computing device 2 and the computing device 3 acquire H_3[:2] and H_3[2:] respectively, and then H_3[:2] and H_3[2:] may be combined to obtain a complete second processing result H_3.

The training of the MoE model can be completed based on the hybrid communication group shown in FIG. 4. The training manner is the same as that in the prior art.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. In addition, those skilled in the art should also appreciate that all the embodiments described in the specification are preferred embodiments, and the actions and modules involved are not necessarily mandatory to the present disclosure.

In brief, by use of the solution in the method embodiment of the present disclosure, the problem of extremely large sparse parameters (such as expert network parameters) can be prevented, thereby preventing problems such as memory overflow caused by impossible support by the computing devices, ensuring normal operation of model training, and more effectively utilizing a storage space to support larger-scale model training, etc.

The above is the introduction to the method embodiments. The following is a further illustration of the solutions of the present disclosure through system embodiments.

Figure 5:
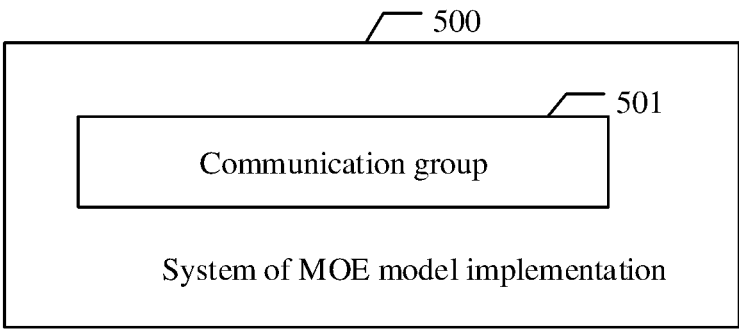
FIG. 5 is a schematic diagram of a composition structure of a first embodiment of a system 500 of MoE model implementation according to the present disclosure.

FIG. 5 is a schematic diagram of a composition structure of a first embodiment of a system 500 of MoE model implementation according to the present disclosure. As shown in FIG. 5, the system includes a communication group 501 and configured to train a hybrid expert model based on the communication group 501.

The communication group 501 may include a tensor-parallelism communication group. The tensor-parallelism communication group includes at least two computing devices, and tensor-parallelism segmentation is adopted for sparse parameters of each of the computing devices in a same tensor-parallelism communication group.

In the solution of the above system embodiment, the tensor-parallelism segmentation is adopted for the sparse parameters, which can prevent extremely large sparse parameters (such as expert network parameters), thereby preventing problems such as memory overflow caused by impossible support by the computing devices and ensuring normal operation of model training.

In an embodiment of the present disclosure, the constructed communication group 501 may further include a data-parallelism communication group, the data-parallelism communication group includes at least two computing devices, and data parallelism is adopted for each of the computing devices in a same data-parallelism communication group. In addition, for any one of the tensor-parallelism communication groups, each of the computing devices is included in a data-parallelism communication group, and a first computing device set formed by the computing devices included in all the data-parallelism communication groups is equal to a second computing device set formed by the computing devices included in all the tensor-parallelism communication groups.

That is, a hybrid communication group including a tensor-parallelism communication group and a data-parallelism communication group may be constructed. Correspondingly, numbers of the tensor-parallelism communication group and the data-parallelism communication group may be both greater than or equal to 2.

In an embodiment of the present disclosure, any one of the computing devices may include: a backbone network configured to perform predetermined processing on input data to obtain a first processing result; a gating network configured to select an expert network as a routing network from expert networks of the computing devices in the data-parallelism communication group, and send the first processing result to the selected expert network; and the expert network configured to perform predetermined processing on the acquired first processing result to obtain a second processing result, and return a return result determined according to the second processing result to the computing device corresponding to the acquired first processing result. Different computing devices in a same tensor-parallelism communication group correspond to a same backbone network and a same expert network.

In addition, in an embodiment of the present disclosure, the tensor-parallelism segmentation may also be adopted for dense parameters of each of the computing devices in the same tensor-parallelism communication group. The sparse parameters include: expert network parameters. The dense parameters include: backbone network parameters.

As described above, the obtained second processing result is further required to be returned to the corresponding computing device. Specifically, the expert network may return a return result determined according to the second processing result to the computing device corresponding to the acquired first processing result.

The return result may refer to the second processing result. That is, the second processing result may be directly returned as the return result.

Alternatively, in an embodiment of the present disclosure, the return result may include: part of content in the second processing result. Correspondingly, FIG. 6 is a schematic diagram of a composition structure of a second embodiment of a system 600 of MoE model implementation according to the present disclosure.

Figure 6:
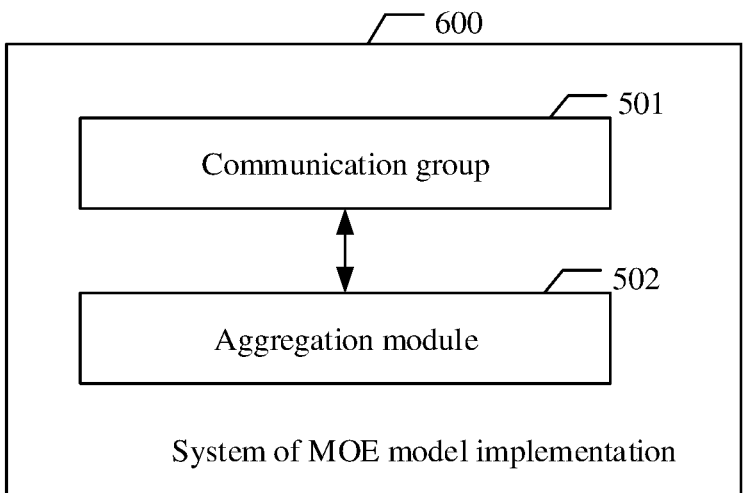
FIG. 6 is a schematic diagram of a composition structure of a second embodiment of a system 600 of MoE model implementation according to the present disclosure.

As shown in FIG. 6, compared with the embodiment shown in FIG. 5, the system further includes: an aggregation module 502 configured to, for any one of the tensor-parallelism communication groups, combine acquired parts of content belonging to a same second processing result to obtain a complete second processing result, the parts of the content being respectively returned by a same expert network corresponding to the computing devices in a same tensor-parallelism communication group.

Specific operation flows of the system embodiments shown in FIG. 5 and FIG. 6 may be obtained with reference to the related description in the above method embodiments. Details are not described again.

In brief, by use of the solution in the system embodiment of the present disclosure, the problem of extremely large sparse parameters (such as expert network parameters) can be prevented, thereby preventing problems such as memory overflow caused by impossible support by the computing devices, ensuring normal operation of model training, and more effectively utilizing a storage space to support larger-scale model training, etc.

The solutions of the present disclosure may be applied to the field of AI, and in particular, relate to fields such as deep learning and distributed storage. AI is a discipline that studies how to make computers simulate certain thinking processes and intelligent behaviors (such as learning, reasoning, thinking, and planning) of human beings, which includes hardware technologies and software technologies. The AI hardware technologies generally include sensors, dedicated AI chips, cloud computing, distributed storage, big data processing, and other technologies. The AI software technologies mainly include a computer vision technology, a speech recognition technology, a natural language processing technology, machine learning/deep learning, a big data processing technology, a knowledge graph technology, and other major directions.

The data in the embodiments of the present disclosure is not specific to a specific user and does not reflect a specific user's personal information. Collection, storage, use, processing, transmission, provision, and disclosure of users' personal information involved in the technical solutions of the present disclosure comply with relevant laws and regulations, and do not violate public order and moral.

According to embodiments of the present disclosure, the present disclosure further provides an electronic device, a readable storage medium, and a computer program product.

Figure 7:
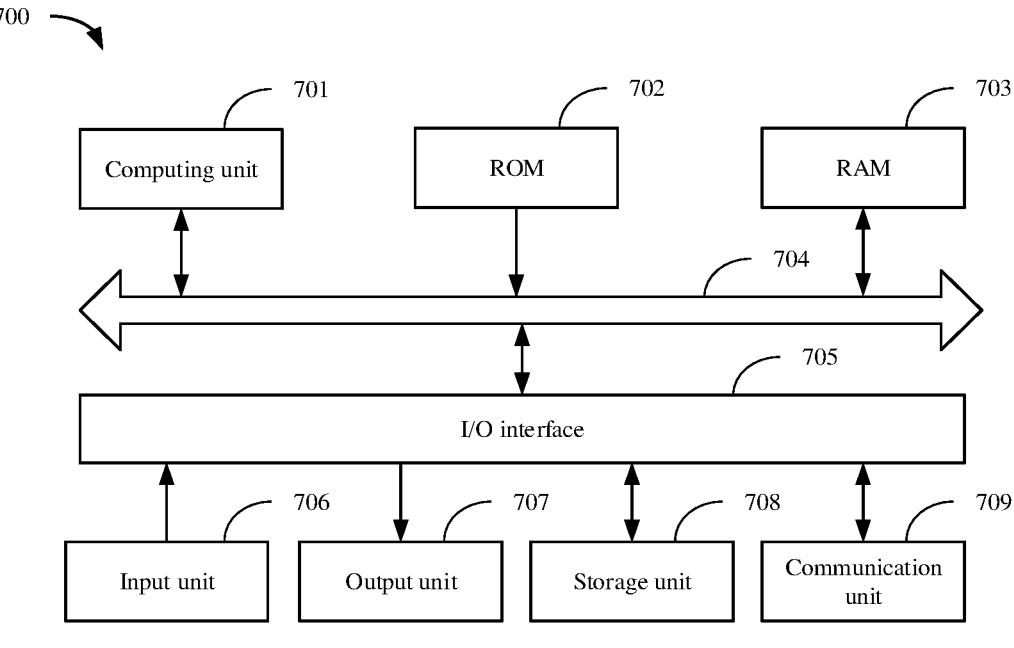
FIG. 7 is a schematic block diagram of an electronic device 700 that may be configured to implement an embodiment of the present disclosure.

FIG. 7 is a schematic block diagram of an electronic device 700 that may be configured to implement an embodiment of the present disclosure. The electronic device is intended to represent various forms of digital computers, such as laptops, desktops, workbenches, servers, blade servers, mainframe computers, and other suitable computers. The electronic device may further represent various forms of mobile devices, such as personal digital assistants, cellular phones, smart phones, wearable devices, and other similar computing devices. The components, their connections and relationships, and their functions shown herein are examples only, and are not intended to limit the implementation of the present disclosure as described and/or required herein.

As shown in FIG. 7, the device 700 includes a computing unit 701, which may perform various suitable actions and processing according to a computer program stored in a read-only memory (ROM) 702 or a computer program loaded from a storage unit 708 into a random access memory (RAM) 703. The RAM 703 may also store various programs and data required to operate the device 700. The computing unit 701, the ROM 702, and the RAM 703 are connected to one another by a bus 704. An input/output (I/O) interface 705 is also connected to the bus 704.

A plurality of components in the device 700 are connected to the I/O interface 705, including an input unit 706, such as a keyboard and a mouse; an output unit 707, such as various displays and speakers; a storage unit 708, such as disks and discs; and a communication unit 709, such as a network card, a modem, and a wireless communication transceiver. The communication unit 709 allows the device 700 to exchange information/data with other devices over computer networks such as the Internet and/or various telecommunications networks.

The computing unit 701 may be a variety of general-purpose and/or special-purpose processing components with processing and computing capabilities. Some examples of the computing unit 701 include, but are not limited to, a central processing unit (CPU), a graphics processing unit (GPU), various AI computing chips, various computing units that run machine learning model algorithms, a digital signal processor (DSP), and any appropriate processor, controller or microcontroller, etc. The computing unit 701 performs the methods and processing described above, such as the method described in the present disclosure. For example, in some embodiments, the method described in the present disclosure may be implemented as a computer software program that is tangibly embodied in a machine-readable medium, such as the storage unit 708. In some embodiments, part or all of a computer program may be loaded and/or installed on the device 700 via the ROM 702 and/or the communication unit 709. One or more steps of the method described in the present disclosure may be performed when the computer program is loaded into the RAM 703 and executed by the computing unit 701. Alternatively, in other embodiments, the computing unit 701 may be configured to perform the method described in the present disclosure by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and commands from a storage system, at least one input apparatus, and at least one output apparatus, and to transmit data and commands to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, the machine-readable medium may be tangible media which may include or store programs for use by or in conjunction with an instruction execution system, apparatus or device. The machine-readable medium may be a machine-readable signal medium or machine-readable storage medium. The machine-readable medium may include, but is not limited to, an electronic, magnetic, optical, electromagnetic, infrared, or semiconductor system, apparatus or device, or any suitable combinations thereof. More specific examples of a machine-readable storage medium may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the scope of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the scope of protection of the present disclosure.

What is claimed is:

1. A method of mixture-of-experts (MoE) model implementation, comprising:

constructing a communication group, the communication group comprising at least two tensor-parallelism communication groups and at least two data-parallelism communication groups, each of the at least two tensor-parallelism communication groups comprising at least two computing devices, tensor-parallelism segmentation being adopted for sparse parameters of each of the at least two computing devices in a same tensor-parallelism communication group, adopting the tensor-parallelism segmentation for dense parameters of each of the at least two computing devices in the same tensor-parallelism communication group; wherein the sparse parameters comprise: expert network parameters; and the dense parameters comprise: backbone network parameters, each of the at least two data-parallelism communication groups comprising two or more computing devices, data parallelism being adopted for each of the two or more computing devices in a same data-parallelism communication group, and for any one of the at least two tensor-parallelism communication groups, each of the at least two computing devices being comprised in a data-parallelism communication group, and a first computing device set formed by the computing devices comprised in all the at least two data-parallelism communication groups being equal to a second computing device set formed by the computing devices comprised in all the at least two tensor-parallelism communication groups; and training an MoE model based on the communication group using speech data, wherein any one of the at least two computing devices comprises:

a backbone network configured to perform a first predetermined processing on the speech data to obtain a first processing result of the speech data;

a gating network configured to select an expert network as a routing network from expert networks of the computing devices in the data-parallelism communication group, and send the first processing result to the selected expert network; and the expert network configured to perform a second predetermined processing on the acquired first processing result to obtain a second processing result of the speech data, and return a return result determined according to the second processing result to the computing device corresponding to the acquired first processing result, the return result comprises: part of a content in the second processing result and the method further comprises: for any one of the at least two tensor-parallelism communication groups, combining acquired parts of the content belonging to a same second processing result to obtain a complete second processing result, the parts of the content being respectively returned by a same expert network corresponding to the computing devices in the same tensor-parallelism communication group, different computing devices in the same tensor-parallelism communication group correspond to a same backbone network and the same expert network.

2. An electronic device, comprising:

at least one processor; and a memory communicatively connected with the at least one processor;

wherein the memory stores instructions executable by the at least one processor, and the instructions are executed by the at least one processor to enable the at least one processor to perform a method of mixture-of-experts (MoE) model implementation, wherein the method comprises:

constructing a communication group, the communication group comprising at least two tensor-parallelism communication groups and at least two data-parallelism communication groups, each of the at least two tensor-parallelism communication groups comprising at least two computing devices, tensor-parallelism segmentation being adopted for sparse parameters of each of the at least two computing devices in a same tensor-parallelism communication group, adopting the tensor-parallelism segmentation for dense parameters of each of the at least two computing devices in the same tensor-parallelism communication group; wherein the sparse parameters comprise: expert network parameters; and the dense parameters comprise: backbone network parameters, each of the at least two data-parallelism communication groups comprising two or more computing devices, data parallelism being adopted for each of the two or more computing devices in a same data-parallelism communication group, and for any one of the at least two tensor-parallelism communication groups, each of the at least two computing devices being comprised in a data-parallelism communication group, and a first computing device set formed by the computing devices comprised in all the at least two data-parallelism communication groups being equal to a second computing device set formed by the computing devices comprised in all the at least two tensor-parallelism communication groups; and training an MoE model based on the communication group using speech data, wherein any one of the at least two computing devices comprises:

a backbone network configured to perform a first predetermined processing on the speech data to obtain a first processing result of the speech data;

a gating network configured to select an expert network as a routing network from expert networks of the computing devices in the data-parallelism communication group, and send the first processing result to the selected expert network; and the expert network configured to perform a second predetermined processing on the acquired first processing result to obtain a second processing result of the speech data, and return a return result determined according to the second processing result to the computing device corresponding to the acquired first processing result, the return result comprises: part of a content in the second processing result; and the method further comprises: for any one of the at least two tensor-parallelism communication groups, combining acquired parts of the content belonging to a same second processing result to obtain a complete second processing result, the parts of the content being respectively returned by a same expert network corresponding to the computing devices in the same tensor-parallelism communication group, different computing devices in the same tensor-parallelism communication group correspond to a same backbone network and the same expert network.

3. A non-transitory computer readable storage medium with computer instructions stored thereon, wherein the computer instructions are used for causing a method of mixture-of-experts (MoE) model implementation, wherein the method comprises:

constructing a communication group, the communication group comprising at least two tensor-parallelism communication groups and at least two data-parallelism communication groups, each of the at least two tensor-parallelism communication groups comprising at least two computing devices, tensor-parallelism segmentation being adopted for sparse parameters of each of the at least two computing devices in a same tensor-parallelism communication group, adopting the tensor-parallelism segmentation for dense parameters of each of the at least two computing devices in the same tensor-parallelism communication group; wherein the sparse parameters comprise: expert network parameters; and the dense parameters comprise: backbone network parameters, each of the at least two data-parallelism communication groups comprising two or more computing devices, data parallelism being adopted for each of the two or more computing devices in a same data-parallelism communication group, and for any one of the at least two tensor-parallelism communication groups, each of the at least two computing devices being comprised in a data-parallelism communication group, and a first computing device set formed by the computing devices comprised in all the at least two data-parallelism communication groups being equal to a second computing device set formed by the computing devices comprised in all the at least two tensor-parallelism communication groups; and training an MoE model based on the communication group using speech data, wherein any one of the at least two computing devices comprises:

a backbone network configured to perform a first predetermined processing on the speech data to obtain a first processing result of the speech data;

a gating network configured to select an expert network as a routing network from expert networks of the computing devices in the data-parallelism communication group, and send the first processing result to the selected expert network; and the expert network configured to perform a second predetermined processing on the acquired first processing result to obtain a second processing result of the speech data, and return a return result determined according to the second processing result to the computing device corresponding to the acquired first processing result, the return result comprises: part of a content in the second processing result; and the method further comprises: for any one of the at least two tensor-parallelism communication groups, combining acquired parts of the content belonging to a same second processing result to obtain a complete second processing result, the parts of the content being respectively returned by a same expert network corresponding to the computing devices in the same tensor-parallelism communication group, different computing devices in the same tensor-parallelism communication group correspond to a same backbone network and the same expert network.

* * * * *